United States Patent [19]

DiPeri

[11] 4,122,828
[45] Oct. 31, 1978

[54] SOLAR ENERGY COLLECTOR FOR DIRECT AIR HEATING

[76] Inventor: Leonard J. DiPeri, 18325 Lahey St., Northridge, Calif. 91324

[21] Appl. No.: 630,360

[22] Filed: Nov. 10, 1975

[51] Int. Cl.² .................................................. F24J 3/02
[52] U.S. Cl. .................................... 126/270; 126/400; 165/170; 165/174
[58] Field of Search ...................... 126/270, 271, 400; 237/1 A; 165/170, 174; 34/93, 219

[56] References Cited

U.S. PATENT DOCUMENTS

| | | | |
|---|---|---|---|
| 2,001,663 | 5/1935 | Carlson | 165/174 |
| 2,680,437 | 6/1954 | Miller | 126/270 |
| 2,907,318 | 10/1959 | Awot | 126/271 |
| 3,231,986 | 2/1966 | Touton | 34/93 |
| 3,894,685 | 7/1975 | Keyes et al. | 126/270 |
| 3,919,998 | 11/1975 | Parker | 126/271 |
| 3,949,732 | 4/1976 | Reines | 126/271 |
| 3,964,268 | 6/1969 | DiPeri | 62/314 |
| 4,027,821 | 6/1977 | Hayes | 126/271 |

FOREIGN PATENT DOCUMENTS 926,336   9/1954   Fed. Rep. of Germany ........... 165/174

OTHER PUBLICATIONS

"Drying Crop with Solar Energy", Agricultural Research, May 1960, p. 14.

*Primary Examiner*—Kenneth W. Sprague
*Assistant Examiner*—James C. Yeung
*Attorney, Agent, or Firm*—William H. Maxwell

[57] ABSTRACT

A solar energy heat collector and use system wherein heat is directly absorbed into a moving column of air and stored in the structure thereof dependent upon the availability of solar radiation and time period of use of said heated air as related to said availability, use being made of large volume-high specific heat material in the collector construction for heat retention without adverse effect upon direct heat absorption into said moving column of air, the use of essentially dry product air being diversified and controllably ducted for utilitarian uses including dwelling interior heating and cloths drying.

6 Claims, 4 Drawing Figures

SOLAR ENERGY COLLECTOR FOR DIRECT AIR HEATING

BACKGROUND

The availability of solar energy is not always coincident with the use requirements therefor in the heating of dwelling interiors and the like, and direct use of solar energy to heat air is not usually practiced since air is a light mass not conducive to the condensed storage of heat; and to these ends a heavier mass such as water has been universally employed for heat collection and storage. Solar collection involving the circulation of liquids therethrough and the voluminous storage tanks therefor are complex and expensive and entail circulation systems and special installation. The heat stored in such liquids is then transferred by suitable means and at additional expense into air for conditioning of buildings and the like, and all to the end that heating is available indirectly when desired by transfer from storage in a thermal mass. In contradistinction, the present invention involves the concept of direct air heating and heat storage in a solar collector per se, it being an object to provide solar air heating and heat storage without resorting to the previously accepted presumption that solar energy must be stored in a remote and voluminous thermal mass for subsequent use. With the present invention, solar energy is directly extracted into a useful air column or it is stored within the thermal mass of the collector structure for subsequent use.

There are useful periods of time during which the heating of air within dwellings is desired. For example, it is desirable to extend a comfortable temperature by heating a building late in the day as and when the sun passes over the horizon; and it is also desirable to establish a comfortable temperature by heating a building early in the day as the sun rises from the horizon. The former desirability requires heat energy storage for subsequent use, while the latter desirability requires immediate use of heat energy. It is an object to meet both desirabilities with the present invention which provides a thermal mass structure for retention of heat and a manifolding of said structure that provides for both direct absorption of heat into a moving column of useful air and indirect storage and subsequent transfer of heat into said air.

It is the heating of air within a structure such as a building or any chamber to be heated with which this invention is concerned, for example a room or any such chamber. It is sensible air or dry air with which this invention is primarily concerned, and air that is moderately heated on demand from a thermostat control or the like for comfort within a room to be occupied by persons, and/or air that is heated to higher temperatures as for example to be discharged through a clothes dryer or the like. In the latter instance, heated dry air discharged through damp clothes has an excellent drying effect which advantageously employs both heat and evaporation. It is an object therefore, to provide solar heated air direct from a collector for utilitarian use in comfort conditioning of building interiors and in chamber conditioning such as in the drying of clothes in a clothes drying unit.

In carrying out this invention, the solar heat collector hereinafter described is installed to face the effective sunlight, and air is blown therethrough and ducted to the utilitarian uses required. In one instance the air is blown through the solar heat collector and into the living quarters of the building on which it is installed. In another instance the air is blown through the solar heat collector and into a heat sink storage space. And in another instance the air is blown through the solar heat collector and into a clothes dryer of conventional design. It is to be understood that recirculation and discharge of the heated air column can be governed by damper controlled ducting as circumstances require.

Heretofore, the storage of heat has been related to relatively heavy masses such as water and rock etc., water having a specific heat of 1. A most widely used building material is wood, such as construction fir, having a specific heat of 0.65 and a density of about half that of water, and consequently having a "heat to volume ratio" increase of about 30% as compared with the standard "water". That is, wood actually has a heat storage capability determinable by its weight-to-volume ratio as related to its specific heat, and this capability is considerable and establishes wood as an efficient thermal mass. In this respect, therefore, it is an object of this invention to employ wood as a heat sink or thermal mass for the storage of solar heat, and simultaneously as the structure of the solar heat collector in which it is employed as the structure elements thereof.

DRAWINGS

The various objects and features of this invention will be fully understood from the following detailed description of the typical preferred forms and applications thereof, throughout which description reference is made to the accompanying drawings, in which.

PREFERRED EMBODIMENT

Figure 1:
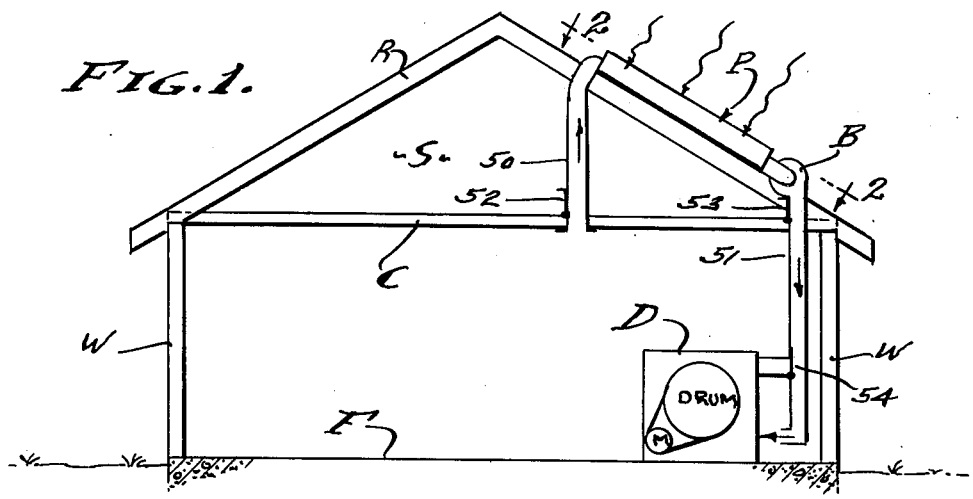
FIG. 1 is a diagrammatic view of the heat collector and storage panel usefully installed in a building structure.

In accordance with this invention, an air heating solar energy system is provided and which comprises a solar heat collector and storage panel P that absorbes and/or retains solar heat for transfer directly into a moving column of air transported therethrough by blower means B; employing a light weight-to-volume mass of relatively high specific heat as the structure that comprises and manifolds the panel for circulation of the column of air therethrough. Referring to FIG. 1 of the drawings, there is a building constructed upon a foundation F and comprised of walls W, a roof R and ceiling rafters C forming a truss and an attic space S, these features being common to the construction of dwellings in which people live and require the conditioning of air by heating. It is known that building structures retain heat and for this reason attic spaces are often ventilated, and despite such precautions wooden rafters and related structure absorb and retain heat and thereby function as a "heat sink". As stated above, the specific heat of construction lumber, wood in general, is 0.65 while its weight-to-volume is low and half that of water upon which said value is based. Therefore, it is feasible to enclose attic spaces with exposed wood structure for subjection to heated air and the absorption and storage of heat, and it is also feasible to employ wooden construction in solar heat collectors for the direct retention of heat. Accordingly, the heat collector and storage panel P is of wooden construction for heat retention therein with the capability of both direct and indirect heat absorption into the moving air column that is circulated therethrough.

Figure 2:
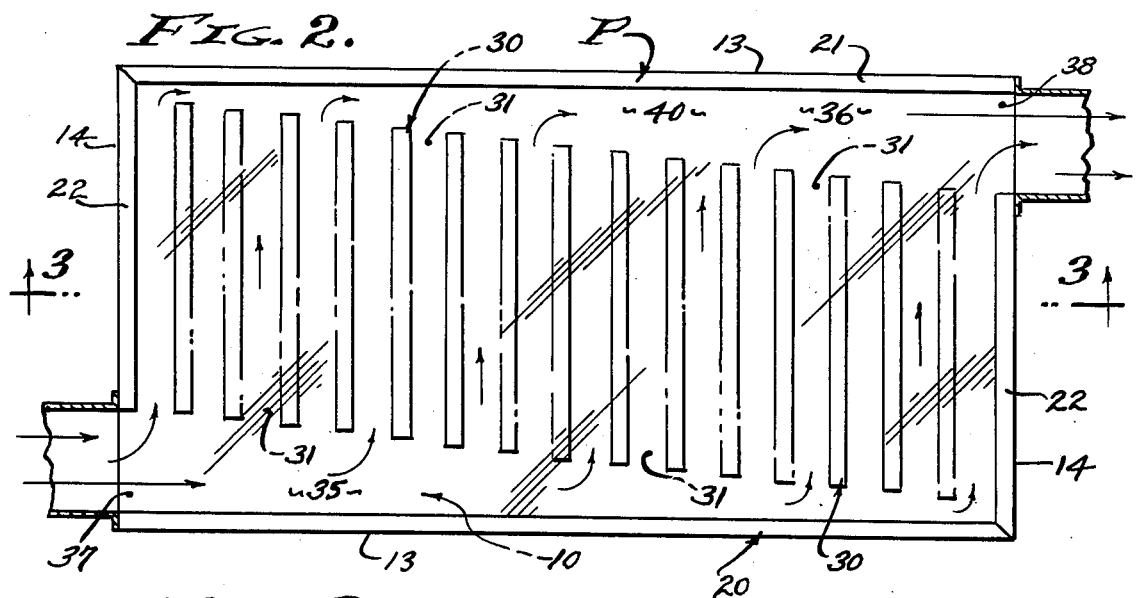
FIG. 2 is an enlarged view of the panel taken substantially as indicated by line 2—2 in FIG. 1.
Figure 3:
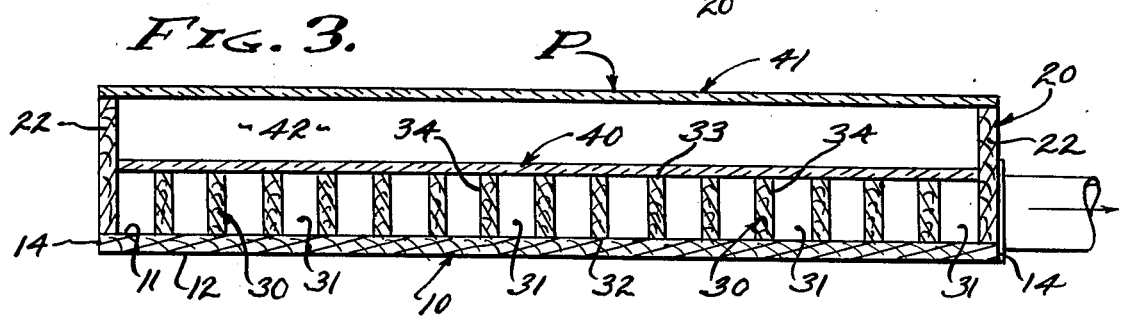
FIG. 3 is a sectional view taken as indicated by line 3—3 on FIG. 2.

Referring now to FIGS. 2 and 3 of the drawings, the panel P involves, generally, a base 10, a frame 20, partitions 30, and inner and outer glazing 40 and 41. It will be readily seen that the well known principles of solar heat collection are employed, using the "hot house" effect of double glazing with an air space therebetween. The collection of solar radiation herein is by a cooperative combination of means which includes, the direct absorption of solar heat into a moving column of air circulated slowly between the partitions 30, the direct absorption of solar heat into the total wooden structure and mainly the said partitions 30, and by the indirect heat transfer at the air-to-wood interfaces throughout the panel structure and mainly with the exposed walls of said partitions. The heat transfer at the air-to-wood interfaces adds or subtracts heat to the useful air dependent upon prevailing conditions, simultaneously with heat absorption by means of solar radiation into both the panel structure and air column moving therethrough. A feature of the panel and its heat retentive partitions 30 is the reduced rate or speed at which the air column moves through the individual heat transferring channels 31 provided therefor.

The base 10 is an imperforate sheet of plywood or the like, of stock dimensions, having substantial thickness for establishing a volume or mass of wood fiber capable of retaining heat according to the specific heat thereof which is nominally 0.65. Thus, the base is a rectangular solid having inside and outside faces 11 and 12, and parallel side and end edges 13 and 14.

The frame 20 is comprised of side and end rails 21 and 22 that project at a normal angle from the perimeter edges 13 and 14 of the base, joined at the corners of the base to form an enclosure over the inside face 11 of the base. The four rails are rectangular in cross section and of substantial thickness for establishing a volume or mass of wood fibers capable of retaining heat according to the specific heat thereof, nominally 0.65.

The partitions 30 characterize the panel construction, being wooden dividers of rectangular cross section and of substantial thickness for establishing a volume or mass capable of retaining heat according to the specific heat thereof which is nominally 0.65. The partitions 30 provide wood fibers which have light weight-to-volume mass with relatively high specific heat, and there is a multiplicity of partitions disposed transversely over the base 10 in parallel relation one to the other, and all of equal height less than the height of the four rails 21 and 22. In practice, the partitions extend from side to side of the base 10, all of a equal length less than the transverse width of the base. As shown, there is a row of partitions 30 extending diagonally between opposite corners of the panel enclosure formed by the rails 21 and 22, the partitions being equally spaced and thereby establishing a multiplicity of open channels 31 therebetween. In practice, the partitions are of identical cross section with bottom edges 32 secured to the inside face 11 of the base, with coplanar top edges 33, and with opposite exposed sides 34 for interface contact with the moving air column.

As shown and described, this arrangement of partitions 30 defines inlet and outlet manifolds 35 and 36 at integrally opposite corner openings 37 and 38, preferably in the end rails 22, for the entry and exit of a moving column of air. The inner exposed surfaces of the base 10, frame 20 and partitions 30 are painted or otherwise coated or colored so as to be heat absorptive, for example made black. Further, in order to minimize losses to the outside air, the exterior of the panel P, not including the glazing, is insulated (not shown).

The inner glazing 40 is a glass or the like coextensively overlying the coplanar edges 33 of the partitions 30 and extending between the rails 21 and 22, thereby enclosing and ducting the channels 31 and manifolds 35 and 36. The outer glazing 41 is also a glass or the like coextensively overlying the coplanar edges of the rails 21 and 22 in spaced relation to the aforementioned glazing 40 to establish a chamber 42 therebetween, to have an insulating and "hot house" effect.

Figure 4:
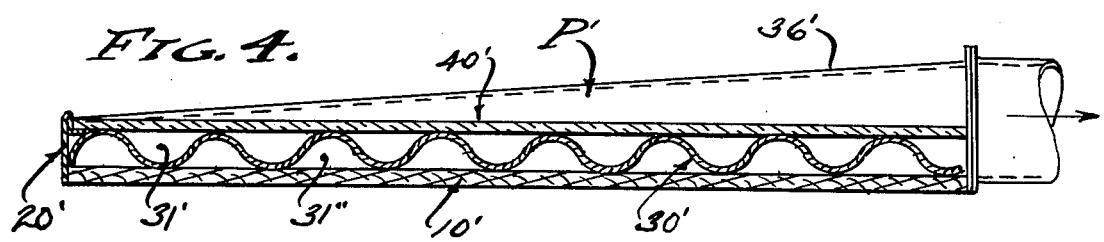
FIG. 4 is a sectional view similar to FIG. 3, showing a second embodiment.

Referring to FIG. 4 of the drawings and second embodiment of the collector, a panel P' for the immediate heating of air is shown and involves generally, a base 10', a frame 20', a corrugated member 30', and at least a single glazing 40' that covers the member 30' to establish channels 31' and 31". In this form of the invention the base 10' and frame 20' are essentially the same as hereinabove described. However, the member 30' is metalic and of corrugated configuration for the immediate heating of a column of air moving simultaneously through the multiplicity of channels 31' and 31" formed by the corrugations. In practice, the corrugations are shallow, for example one half to 1 inch in height. As shown, the glazing 40' engageably encloses and ducts the upwardly faced corrugations while the base 10' engageably encloses and ducts the downwardly faced corrugations, and to the end that the upwardly faced channels 31' provide for direct solar heating of air while the downwardly faced channels 31" provide for indirect solar heating of air. That is, in the latter instance heat is transferred through the member 30', and by employing metal therefor, such as aluminum, that has a high conductivity for the immediate and efficient transfer of heat into the air within channels 31". The inlet and outlet manifolds 36' (identical inlet not shown) are of increasing height from the narrow to wide plan view dimensions thereof, for the equally distributed flow through the channels 31' and 31".

The heat collector and storage panel P hereinabove described is installed on a building generally as shown in FIG. 1, with its inlet opening at 37 ducted through an inlet duct 50 and with its outlet opening 38 ducted through a blower B and delivery duct 51. As shown, the inlet duct 50 is damped with a valve 52 that selectively draws return air from the occupied building interior or from the attic space S. The delivery duct 51 is damped with a valve 53 that selectively discharges delivery air into the occupied building interior or into the attic space S, and a valve 54 that selectively discharges delivery air into the occupied building interior or into a utility unit or clothes dryer D. As is indicated the valve 53 pre-empts discharge through valve 54, said blower and valves being operable through suitable and conventional means as circumstances require.

From the foregoing it will be seen that solar radiation penetrates the glazing, preferably the double glazing 40-41, and enters the channels 31 and manifolds 35 and 36 and thereby directly subjects the entire enclosure, air and wood structure, to heat absorption. The diagonal arrangement of partitions 30 establishes tapered manifolds 35 and 36 for equal flow through the multiplicity of panels 31 at a rate or speed which is a function of the total channel cross sectional area as compared with the inlet and/or outlet cross sectional area. Consequently the flow rate through the multiplicity of channels 31 is relatively slow and conducive to the absorption of solar heat. Simultaneously with the heating of air moving through the channels 31 the partitions also absorb solar heat which is retained in the wood fiber mass of large volume and relatively light weight.

A normal operation of the system involves the positioning of valve 52 to draw from the building interior and the positioning of valves 53 and 54 to discharge into said building interior. An alternate operation of the system involves positioning of valves 53 and 54 to discharge air through the clothes dryer D. Voluminous storage of heated air and heat sink storage is gained by positioning valve 53 to discharge into the attic space S, and withdrawal from the heat sink and stored attic air is gained by positioning valve 52 to draw from said attic space S. It is the direct heating of air within the collector panel and the supplemental retention of heat within the wood fiber mass for subsequent use that is advantageous and characteristic of this invention, and as shown the direct and indirect heating of air within the collector per se is applicable to air conditioning and utility units such as clothes dryers and the like.

Having described only typical preferred forms and applications of my invention, I do not wish to be limited or restricted to the specific details herein set forth, but wish to reserve to myself any modifications or variations that may appear to those skilled in the art:

I claim:

1. A solar heat collector and heat storage panel for the direct and indirect absorption of heat into a moving column of air, and including; a base with a projecting perimeter frame forming an enclosure to be faced openly toward the radiant sun, a heat storage mass in the form of a multiplicity of partitions of substantial body made of wooden heat sink members disposed in spaced parallel relation transversely of the frame and exposed to open uni-directional channels therebetween, inner glazing supportably engaged with said multiplicity of partitions respectively to separately duct the multiplicity of channels, outer glazing spaced from the inner glazing and engaged with the perimeter frame to form a chamber, and inlet and outlet manifold means directing air flow uniformly and transversely through said multiplicity of ducted channels.

2. The solar panel for direct and indirect heating of air as set forth in claim 1, wherein the heat storage mass includes a wooden base of substantial volume for retention of absorbed solar heat.

3. The solar panel for direct and indirect heating of air as set forth in claim 1, wherein the heat storage mass includes a wooden base and frame of substantial volume for retention of absorbed solar heat.

4. The solar panel for direct and indirect heating of air as set forth in claim 1, wherein the perimeter frame has side rails, and wherein the heat storage mass partitions of wooden members are shorter than the distance between the side rails and the multiplicity thereof disposed in a row extended diagonally between opposite sides of the frame for retention of absorbed radiant heat.

5. The solar panel for direct and indirect heating of air as set forth in claim 1, wherein the base has a perimeter frame with side and end rails, and wherein the heat storage mass partitions of wooden members are shorter than the distance between the side rails and the multiplicity thereof disposed in a row between the end rails and extended diagonally between opposite sides of the frame for retention of absorbed solar heat.

6. A solar heat collector for the direct and indirect absorption of heat into a moving column of air and including; a heat storage mass in the form of a channel of substantially massive heat heat sink members of wood to be faced openly toward the radiant sun for the absorption and retention of solar heat, glazing engaged with the heat sink members and covering said channel and ducting the same for movement of the said air column therethrough, and inlet and outlet means directing air flow through the said ducted channel.

* * * * *